United States Patent [19]

Colley

[11] Patent Number: 5,592,382
[45] Date of Patent: Jan. 7, 1997

[54] DIRECTIONAL STEERING AND NAVIGATION INDICATOR

[75] Inventor: Jaime B. Colley, Laguna Niguel, Calif.

[73] Assignee: Rockwell International Corporation, Seal Beach, Calif.

[21] Appl. No.: 402,434

[22] Filed: Mar. 10, 1995

[51] Int. Cl.⁶ .......................... G06G 7/78; G08G 1/123
[52] U.S. Cl. ..................... 364/449.1; 364/444.1; 364/447; 364/460; 340/990; 340/994; 342/357
[58] Field of Search ..................... 364/424.01, 444, 364/449, 452, 458, 447, 460, 424.02; 342/357, 358, 457; 840/988, 989, 992, 994, 995, 425.5; 815.55, 815.78

[56] References Cited

U.S. PATENT DOCUMENTS

| | | |
|---|---|---|
| 4,281,326 | 7/1981 | Anderson ..................... 342/41 |
| 4,466,068 | 8/1984 | Degré et al. ................. 364/461 |
| 4,590,569 | 5/1986 | Rogoff et al. ................ 364/452 |
| 4,623,966 | 11/1986 | O'Sullivan .................. 364/461 |
| 4,692,869 | 9/1987 | King et al. .................. 364/448 |
| 4,893,127 | 1/1990 | Clark et al. ................. 342/386 |
| 5,179,385 | 1/1993 | O'Loughlin .................. 342/176 |
| 5,268,844 | 12/1993 | Carver et al. ................ 364/443 |

OTHER PUBLICATIONS

Fix et al., "Advance Reference System Cockpit Display Project", IEEE 1990, pp. 338–342.
Ranson, "Navigating Between Computer Displays in Power Plants" IEEE 1993, pp. 273–277.
Rogoff, "Electronic Charts as the Basis for Integrated Marine Navigation", IEEE 1992, pp. 256–260.

Primary Examiner—Gary Chin
Assistant Examiner—Tan Q. Nguyen
Attorney, Agent, or Firm—George A. Montanye; David J. Arthur; Susie H. Oh

[57] ABSTRACT

A navigation and guidance system which directs a user toward a desired destination. Position and steering information are integrated into a single display to allow the user to immediately determine whether the correct course is being traveled, and to inform the use of any directional changes which may be necessary to be directed toward the desired destination waypoint. The user's position and course are determined by a navigation system and indicated on the display as a directional pointing icon, such as a line or arrow. The destination is displayed as a point. The user's Point of Closest Approach (PCA) can then be calculated according to current position, course, and the position of the desired destination. As the use's course gets closer to the bearing of the destination waypoint the PCA indicator can correspondingly shift with the user's movements. By superimposing the PCA over the destination waypoint, the user may precisely steer his or her craft to the desired destination.

17 Claims, 3 Drawing Sheets

DIRECTIONAL STEERING AND NAVIGATION INDICATOR

BACKGROUND OF THE INVENTION

1. Field of the Invention

The present invention relates to navigation and steering schemes for use in marine, land, and air directional control. More particularly, the present invention relates to the display and expression of position and navigation information in a simple and direct format for immediate identification of the user's present location relative to a desired location.

2. Description of Related Art

Advances in data storage and display technologies have made electronic charts a necessary means to efficiently and accurately assist users in determining their positions relative to a desired destination. For example, when electronic charts are integrated with a positioning system such as the global positioning system (GPS), the user's position can be displayed in real time on a chart depicting the user's area. Such information is particularly useful for operators of marine, land, and air vehicles who continuously need to know of their positions around the earth. However, simply knowing one's position on a chart is generally not sufficient. It is also particularly helpful to know whether the present course of direction is correct. That is, users typically need to know if their present course will take them where they want to go. The desired destination could be the next waypoint on the route or some other location on the chart.

Current commercially available electronic chart display implementations typically indicate relevant geographic features, routes and waypoints, the user's position, and the user's track. However, such displays do not include integrated steering information informing the user whether (1) the user's current course is properly directing the user towed the desired destination, and (2) any course corrections are needed to ensure the user arrives at this destination. Rather, in conventional chart display schemes, a separate display medium must be implemented. However, to review the additional course information, the user must switch between a position display and a steering correction display for a complete understanding of the total navigation situation.

For example, FIG. 1(a) shows the current implementation in most commercial systems. A desired route with dotted waypoints 102 is indicated by the straight lines 104 which comprise the intended track 114. The destination waypoint is shown as a circled dot 110, and the dotted line 112 indicates the user's actual track. In the example, the arrow 116 at the top end of the dotted line 112 shows the user's position and current heading. However, to retrieve steering data and correction information, the user must refer to FIG. 1(b). FIG. 1(b) represents a steering screen which is used to correct a current route and, thus, to enable users to steer themselves toward a desired destination waypoint. That is, the object of the steering screen is to point the illustrated arrow 118 toward the flag 120. When the arrow 118 points at the flag 120, the course-over-ground indication (COG) will match the bearing indication (BRG).

However, to reach the point where the user is traveling toward the destination waypoint, numerous attempts at directing and redirecting the arrow toward the flag may be required. Consequently, however, the user must switch back and forth from screen-to-screen to determine if the track is correct according to the graphical as well as numerical representation. Because there are no visual or graphical cues to indicate whether the user is successfully steering toward the desired path, immediate course correction is difficult.

SUMMARY OF THE INVENTION

The present invention is directed to a navigation and guidance system which directs a user toward a desired destination. Position and steering information are integrated into a single display to allow the user to immediately determine whether the correct course is being traveled, and to inform the user of any directional changes which may be necessary to be directed toward the desired destination. The desired destination is displayed on an electronic charting system by a destination waypoint. Several segment waypoints define an optimum route to reach the destination waypoint. Accordingly, the desired destination is represented by a destination waypoint.

The actual track of the user is displayed relative to the segment waypoints such that the user's actual track is superimposed over the optimum route. The user's position and COG are determined by the navigation system and indicated on the display as a directional pointing icon, such as a line or arrow. The user's Point of Closest Approach (PCA) can then be calculated according to several functions: 1) the user's current position; 2) the position of the desired destination; and (3) the user's COG. The PCA is indicated at or near the end of the user's actual pointing icon so that as the user's course gets closer to the destination waypoint bearing, the PCA pointer can correspondingly shift with the user's movements.

Ultimately, the user may precisely direct his or her craft to the destination waypoint by simply overlaying the PCA pointer over the destination waypoint and maintaining that particular course. The overlaid icons represent the directional information relating to the course-over-ground and bearing information. When the two icons are overlaid, the COG will match the bearing to destination value. That is, when the user's actual location coordinates superimpose those of the destination waypoint, such that the icon representing the user or the user's craft is displayed over that of the destination waypoint, it can be determined that the user has arrived at the desired destination.

DETAILED DESCRIPTION OF THE PREFERRED EMBODIMENTS

The following description is of the best presently contemplated mode of carrying out the invention. In the accompanying drawings, like numerals designate like parts in the several figures. This description is made for the purpose of illustrating the general principles of the invention and should not be taken in a limiting sense. The scope of the invention is best determined by reference to the accompanying claims.

Embodiments of the present invention utilize data retrieved from a variety of navigation systems, such as the global positioning system (GPS), LORAN, inertial navigation, and/or radar systems in conjunction with Point-of-Closest-Approach (PCA) calculations. The PCA is the point along the current course that is closest to a predefined destination. That is, the point at which the user or the user's craft will pass closest to the desired destination can be determined according to the location coordinates of the destination, the user's position relative to the earth, and the direction of the craft. The PCA is then displayed in a single screen format to represent steering information.

By displaying the PCA on a chart concurrently with the course, bearing, and position information, the user is given an immediate view of the navigation requirements, and can respond accordingly. Users are made aware of where they are; they know where they want to go; and, with the PCA displayed, they know how close they are going to be if they continue along the current course. Thus, to reach the desired destination, a user only needs to steer toward a course which places the PCA over the destination point.

Figure 2:
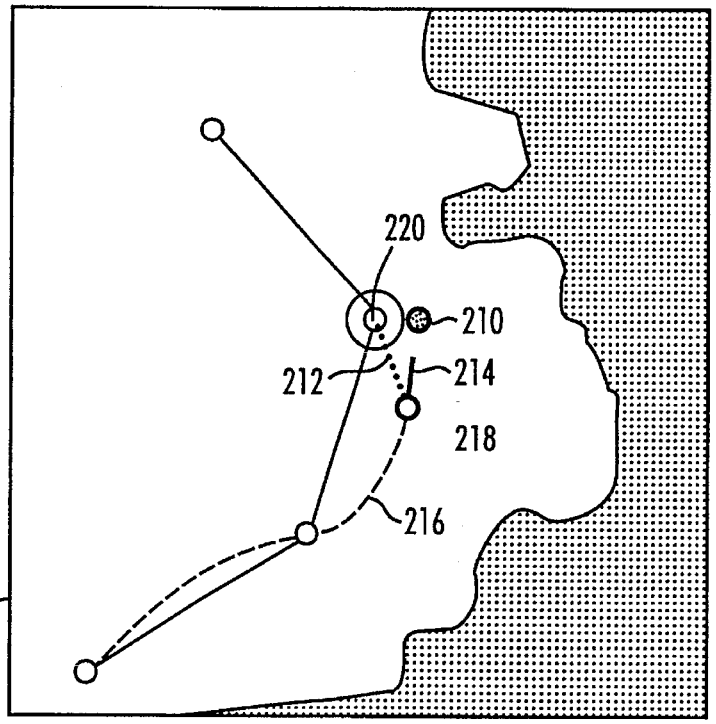
FIG. 2 is a schematic view of an integrated steering indicator display in accordance with a preferred embodiment of the present invention.
Figure 2:
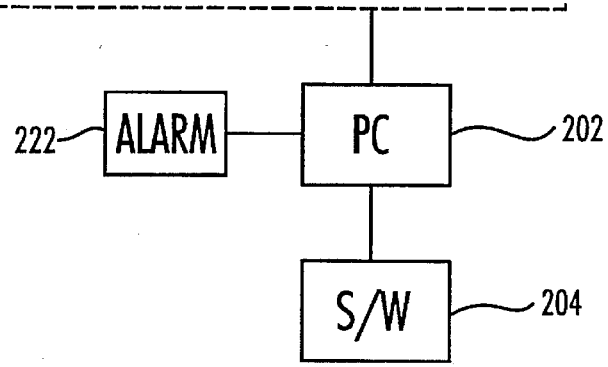

As illustrated in the preferred embodiment of FIG. 2, a single display screen 200 is shown. A computer 202 is programmed 204 to drive the position displays 240 including, for example, the course-over-ground (COG) indication, bearing data (BRG), the speed over ground (SOG), speed made good (SMG), distance to waypoint (DST), and the time to go (TTG). The numerical table or listing 240 is optional in that the numerical data is embodied by the movement of the graphical icons illustrated in the display 200. Accordingly, reference to a numerical coordinates table is unnecessary for steering and position correction or adjustment.

Embodiments of the invention operate with navigation hardware (not shown) which is implemented to provide information concerning the user's current position, the user's COG data, and the position/coordinates of the desired destination. For example, the navigation hardware may include a GPS receiver or LORAN receiver, as well as display devices and/or electronic charts, in conjunction with a programmable computer to drive the displays.

Thus, preferably the display 200 shows a graphical representation of numerical data combined with instantaneous course correction information. The actual track 216 of the user is designated as a dotted line. The PCA 210 is shown relative to the user's current position 218 and the destination waypoint 220. A bearing-to-destination (BTD) indicator 212 connects the destination waypoint to the user's current position showing the direction from the user's position to the destination waypoint.

In preferred embodiments, a COG indicator 214 is coupled to the current position icon 218 to provide a clear indication of the direction of travel of the user. The COG 214, in conjunction with the PCA 210 and the BTD indicator 212, allows the user to immediately respond and react to information indicating that he or she may be moving away from the destination waypoint 220. Thus, by attempting to align the COG indicator 214 with the bearing-to-destination indicator line 212 and by overlaying the PCA over the destination waypoint, the user is immediately visually informed as to whether further steering adjustments should be made to accurately direct the user toward the destination waypoint.

Consequently, as illustrated in the preferred embodiment of FIG. 2, by combining two display implementations, a significant navigation difficulty can be solved with a single display manifested as a computer screen. Embodiments of the present invention provide a means to inform the user which way to steer or turn his or her craft and to allow the user to immediately confirm the navigational changes, and then proceed to the destination waypoint. Simultaneously, the user can determine his or her progress along the intended track and/or the current position on the chart. By combining PCA and BTD data, the user is able to make immediate and spontaneous adjustments to the desired track, and concurrently confirm the adjustments.

Figure 3:
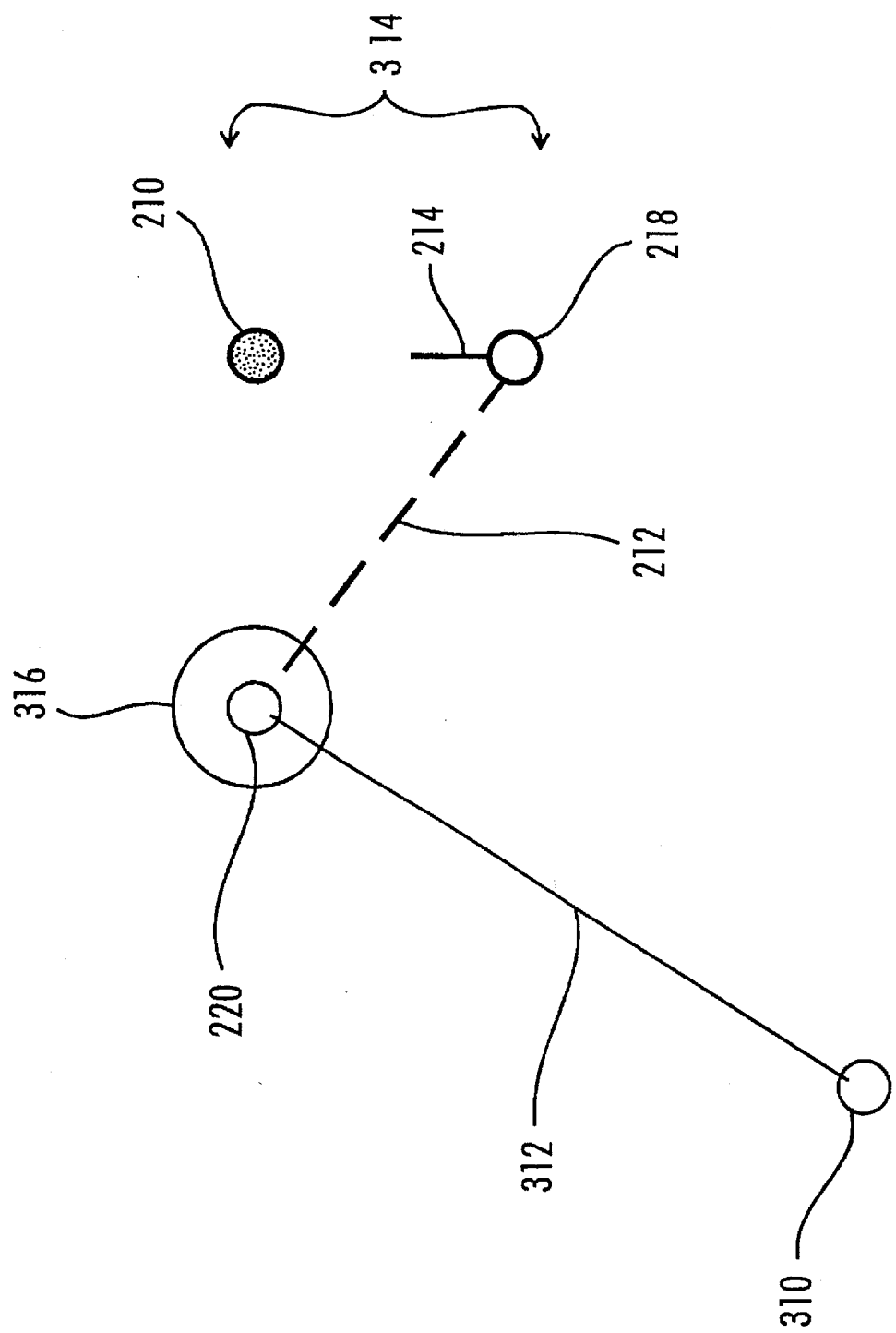
FIG. 3 is an enlarged view of the steering indicator of FIG. 2.

More particularly, in FIG. 3, the BTD indicator 212, the COG indicator 214, and the PCA 210 are illustrated in enlarged detail. As explained above, by combining the steering and navigation indicators into a single, integrated display system 200 (FIG. 2), users can quickly and easily determine their current locations relative to the desired destinations 220, and how to best reach the desired destinations.

An origin waypoint 310 represents one of the segment waypoints, as shown in FIG. 2. The origin waypoint is often described with respect to point-to-point navigation, which allows the user to follow multiple straight-line segments along a route. The origin waypoint indicates the beginning of the leg, while the destination waypoint indicates the end of the leg. By connecting the points along the route, each origin and destination waypoint describes a leg of the route, which is shown in FIG. 3 as a desired track 312. Ideally, the user's actual track 216 (FIG. 2) will be superimposed over the desired track, as the user moves from waypoint to waypoint. Thus, each time the user switches to another leg of the desired track 312, the previous destination waypoint becomes a new origin waypoint for the next leg.

In the preferred embodiment of FIG. 3, it will be seen that the length of the BTD indicator 212 will vary according to the location of the current position 218 relative to the destination waypoint 220. Similarly, the distance 314 between the current position 218 and the PCA 210 will increase as the user turns toward the destination waypoint 220. The distance 314 will reach its largest value when the user or the user's craft is pointing directly at the destination waypoint, such that the PCA 210 is superimposed over the destination waypoint 220.

It will be recognized that the circumferential track of the PCA indicator about the current position indicator will vary between a circular shape and a heart shape. As the distance between the current position and the PCA depends on the user's position relative to the destination waypoint, the point of closest approach generally maintains a very small sphere or track about the current position. The distance between the user and the PCA reaches a maximum value when the user is pointing directly at the destination waypoint, and it reaches a minimum value when the user is pointing exactly 90 degrees from the destination waypoint. This generally ensures that the PCA will remain visible on the display.

Accordingly, in preferred embodiments, as the computer and software arrangement continuously determines the COG and BRG values, and the corresponding graphical representations are displayed on the steering screen, the user can manually or automatically direct the PCA indicator 210 toward the destination waypoint 220. Since the distance between the destination waypoint 220 and the PCA 210 vary according to the movement of the user relative to the destination waypoint 220, the user can see immediately how close he or she will come to the target destination. Once the PCA 210 superimposes the destination waypoint 220, the user can conclude that by continuing in the selected path, he or she will ultimately arrive at the desired destination.

As can be seen in FIGS. 2 and 3, the COG indicator 214 is a gross indicator. The COG indicator 214 simply shows the general direction in which the user is headed. Depending upon the precision and relative size of the display markings, even if the COG indicator 214 matches, i.e., appears to lay over, the BTD indicator 212, error may be present, especially over long distances.

In preferred embodiments of the present invention, the destination waypoint 220 is placed in an arrival circle 316 (FIG. 3) for additional ease of steering adjustment. The arrival circle 316 provides a more precise indication to the user that he or she is moving closer to the desired destination. Preferably, the computer/program assembly includes an alarm system 222 such that when the user's current position indicator 218 enters the arrival circle 316 an alarm will be triggered and generate beeping sounds or flashing lights. In this way, the user is informed that he or she getting very close to the destination waypoint, and a change in heading, speed, or both may be required.

Figure 1A:
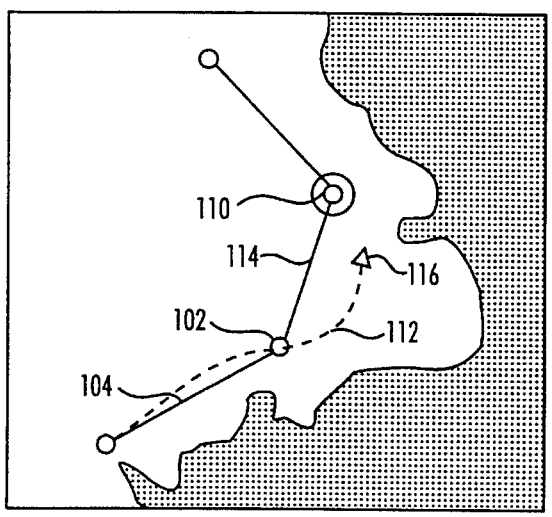
FIGS. 1(a) and 1(b) show a conventional charting display scheme in which two display screens depict graphical and numerical positioning and correction information.
Figure 1B:
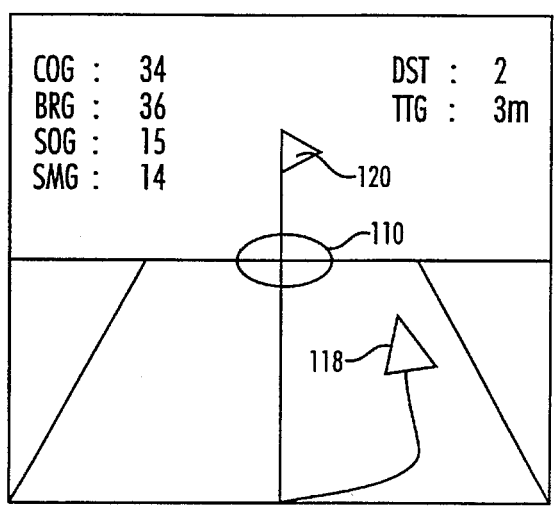

A wide variety of data, display, and other steering implementations have been described herein. It should be appreciated, however, that other information may be included in the steering indicator embodiments of the present invention. In an alternate embodiment of the present invention, and as discussed briefly above, a variety of alphanumeric data may be included in the display. For ease of installation, manufacturers may desire to retrofit embodiments of the present invention into existing display schemes. Accordingly, the computer may be programmed to incorporate the graphical steering and directional representations of the present invention into the steering screen provided by existing conventional charts such as that shown in FIG. 1(b).

While display system embodiments discussed above relate to a user steering a craft, such as a boat or aircraft, it will be recognized that embodiments of the invention may be incorporated into almost any type of moving object, system, or simply carried by a person. Applications for the present invention may vary widely. Any application where latitude, longitude, and course information is available may utilize steering indicator embodiments of the present invention. For example, hikers or horseback riders may find it useful to have a guidance tool which can enable them to determine whether they are on a correct course, and what changes to make if they are not.

This detailed description is set forth only for purposes of illustrating examples of the present invention and should not be considered to limit the scope thereof in any way. Clearly numerous additions, substitutions, and other modifications can be made to the invention without departing from the scope of the invention which is defined in the appended claims and equivalents thereof.

I claim:

1. A system for indicating directional information to a user having a current position traveling on a current course toward a desired destination, comprising:

a computer having a display;

a navigation system coupled to the computer for providing position and course data;

means for determining a point of closest approach (PCA) to the desired destination in accordance with the user's current position, and current course, the desired destination having an associated waypoint representing the desired destination on the display;

means for indicating integrated steering information to the user including:

means for informing the user whether the current course will direct the user to the waypoint, and means for correcting the current course of the user to enable the user to reach the waypoint by directing the PCA to coincide with the waypoint; and means for displaying the corrected current course to the user, wherein the user's current position and course, the PCA, the desired destination, and the integrated steering information are simultaneously and integrally displayed on the computer display.

2. A positioning apparatus for indicating integrated directional and point of closest approach (PCA) information to a user traveling along a current course toward a desired destination, the positioning apparatus operable with a computer and a navigation system providing the user's current position data, destination position data, bearing data, and course-over-ground (COG) data, comprising:

destination position means for indicating the position of the desired destination;

current position means for indicating the current position of the user relative to the desired destination;

PCA means for indicating a position along the current course that is closest to the desired destination;

COG position means for indicating the COG data, the COG position means coupled to the current position means, wherein the COG data represents the direction of travel of the user at the user's current position, further wherein the PCA means is coupled along a line formed by the current position means and the COG position means;

bearing-to-destination (BTD) means for integrally coupling the destination position means with the current position means; and alignment means for aligning the COG position means with the BTD means such that the PCA means coincides with the destination position means, wherein the user is oriented such that the COG means superimposes the BTD means, further wherein when the PCA means coincides with the destination position means, the user's current course is directed toward the desired destination.

3. The positioning apparatus of claim 2, further comprising display means for displaying the destination position means, the current position means, the PCA means, the COG position means, and the BTD means, such that as the alignment means aligns the COG position means with the BTD means, the PCA means gets closer to the destination means, wherein when the PCA means matches the destination position means, the PCA means superimposes the destination position means.

4. The positioning apparatus of claim 3, further comprising an arrival indicator for indicating that the PCA means is getting closer to the destination position means.

5. The positioning apparatus of claim 4, further comprising an alarm for indicating that the PCA means has reached the arrival indicator.

6. The positioning apparatus of claim 2, further comprising numerical data means for indicating to the user numerical information regarding the COG position, the distance between the user's current position and the desired destination.

7. The positioning apparatus of claim 3, wherein the display means is a computer screen.

8. The positioning apparatus of claim 2, wherein the distance between the current position means and the PCA means varies as the COG position means is aligned with the BTD means.

9. The positioning apparatus of claim 2, wherein the navigation system comprises the global positioning system.

10. The positioning apparatus of claim 2, wherein the navigation system comprises a LORAN navigation system.

11. The positioning apparatus of claim 2, wherein the navigation system comprises an inertial navigation system.

12. An integrated steering indicator operable with a programmable computer and a navigation system, the integrated steering indicator for displaying point of closest approach (PCA), route, and position information to a traveling operator, to direct the operator from an origin to a desired destination, the origin and desired destination having an associated origin waypoint and a destination waypoint, respectively, the positions of the origin and destination waypoints being determined by the navigation system, respectively, the integrated steering indicator comprising:

an origin waypoint indicator for displaying the position of the origin waypoint;

a destination waypoint indicator for displaying the position of the destination waypoint relative to the origin waypoint;

a current position indicator for indicating a current position of the operator;

a course-over-ground (COG) indicator integrally coupled to the current position indicator for indicating a direction of travel of the operator;

a PCA indicator positioned in line with the COG indicator;

a bearing-to-destination (BTD) indicator defining a line between the destination waypoint and the operator's current position;

means for steering the COG indicator toward the destination waypoint such that the PCA indicator moves toward the destination waypoint indicator, wherein as the PCA indicator moves toward the destination waypoint indicator, the operator travels toward and in the direction of the desired destination; and alignment means for aligning the COG indicator with the BTD indicator such that the PCA indicator superimposes the destination waypoint indicator, such that the operator is traveling directly toward the desired destination.

13. The integrated steering indicator of claim 12, further comprising icons for representing the origin waypoint, destination waypoint, COG, BTD, PCA, and current position indicators, and a screen coupled to the computer for displaying the representative icons.

14. The integrated steering indicator of claim 13, further comprising an arrival indicator encompassing the destination waypoint indicator for indicating when the PCA indicator is within a predetermined distance to the destination waypoint.

15. The positioning apparatus of claim 14, further comprising an alarm for indicating that the PCA indicator has reached the arrival indicator.

16. A method for steering a user having a current position toward a desired destination, wherein the user moves in a direction of travel associated with course-over-ground (COG) data, comprising the steps of:

providing location information of the user's current position, the desired destination, and the user's COG data representing the user's direction of travel;

displaying the position of the desired destination;

simultaneously indicating the current position of the user relative to the desired destination;

displaying the COG data integrally with the user's current position to indicate a direction of travel of the user;

displaying a point-of-closest-approach (PCA) of the user's current position integrally with the user's direction of travel, wherein the PCA indicates whether the user will reach the desired destination according to the user's current direction of travel; and aligning the PCA with the desired destination, such that when the PCA superimposes the position of the desired destination, the user's current direction of travel accurately matches the bearing of the desired destination.

17. A positioning apparatus for integrally displaying directional and point of closest approach (PCA) information to a user traveling along a current course toward a desired destination, the positioning apparatus operable with a computer and a navigation system providing the user's current position data, destination position data, bearing data, and course-over-ground (COG) data, wherein the user's current position data, destination position data, bearing data, and COG data are graphically represented on the computer, the positioning apparatus comprising:

a display coupled to the computer;

destination position means for indicating the position of the desired destination on the display;

current position means for indicating the current position of the user relative to the desired destination on the display;

PCA means for displaying a position along the current course that is closest to the desired destination;

COG position means for indicating the COG data on the display, the COG position means coupled to the current position means, wherein the COG data represents the direction of travel of the user at the user's current position;

bearing-to-destination (BTD) means for integrally coupling the destination position means with the current position means; and alignment means for enabling the COG position means to be aligned with the BTD means, the PCA means being displayed to move toward the destination position means, such that the user is oriented to cause the COG means to move closer to the BTD means, wherein when the PCA means coincides with the destination position means the display indicates that the user's current course is directed toward the desired destination.

* * * * *